July 7, 1953
C. R. SEBENS
2,644,318
WATER COOLER FOR REFRIGERATOR
Filed Jan. 6, 1950
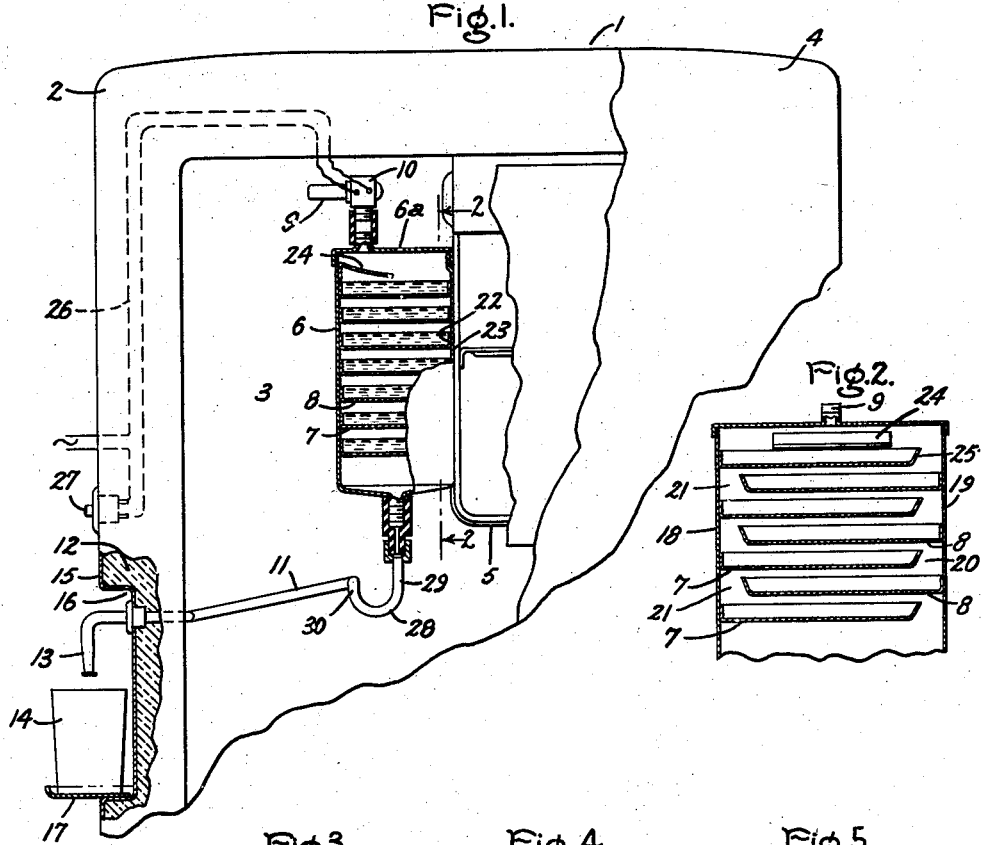
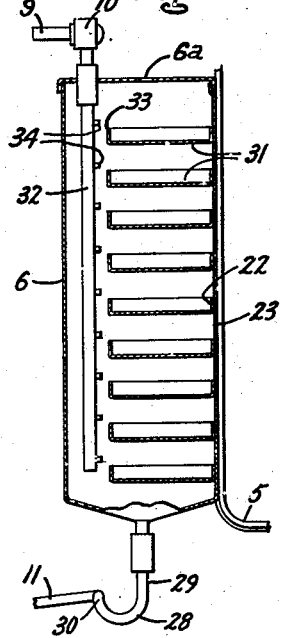
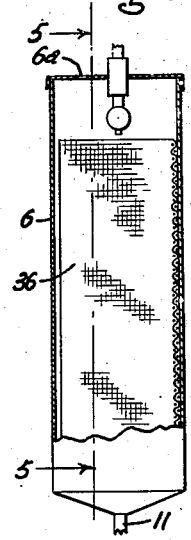
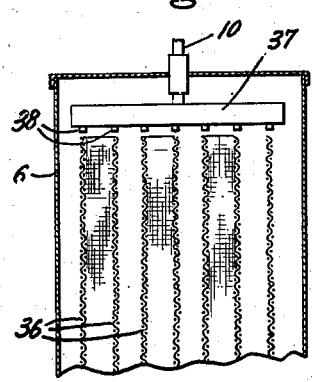
Inventor:
Carl R. Sebens,
by William G. Edwards, Jr.
His Attorney.

Patented July 7, 1953

2,644,318

UNITED STATES PATENT OFFICE 2,644,318

WATER COOLER FOR REFRIGERATOR

Carl R. Sebens, Bridgeport, Conn., assignor to General Electric Company, a corporation of New York Application January 6, 1950, Serial No. 137,201

10 Claims. (Cl. 62—99)

1

My invention relates to water coolers and more particularly to water coolers for use with household refrigerators.

It is an object of my invention to provide an improved water cooling arrangement for household refrigerators.

It is another object of my invention to provide an improved water cooling arrangement for household refrigerators which provides for the rapid cooling of water.

Further objects and advantages of my invention will become apparent as the following description proceeds, and the features of novelty which characterize my invention will be pointed out with particularity in the claims annexed to and forming part of this specification.

In carrying out the objects of my invention, a housing is arranged in heat exchange relationship with the cooling unit of the refrigerator and a plurality of water- and ice-retaining elements are provided within this housing, and water is circulated over these elements so that it is rapidly cooled by contact with the ice frozen thereon.

For a better understanding of my invention, reference may be had to the accompanying drawing, in which Fig. 1 is a view of a portion of a refrigerator, partly broken away to illustrate an embodiment of my invention; Fig. 2 is a sectional elevation view taken along the line 2—2 in Fig. 1; Fig. 3 is a sectional elevation view of a modified form of my invention; Fig. 4 is a sectional elevation view of another modified form of my invention; and Fig. 5 is a sectional view taken along the line 5—5 in Fig. 4.

Referring to Fig. 1, there is shown a refrigerator 1 including a cabinet 2 having a food storage compartment 3 therein. A door 4 is provided for closing the access opening of the food storage compartment. An evaporator or cooling unit 5 is provided within the food storage compartment 3, the evaporator being refrigerated by refrigerant supplied from a suitable condensing unit (not shown).

The water cooler of my invention is arranged within the compartment 3 so that the water circulated therethrough is cooled by the evaporator 5. The water cooler includes a housing 6 which is secured to a side of the evaporator 5 in heat exchange relationship therewith. The housing 6 may be secured to the evaporator 5 in any suitable manner, as by welding. A plurality of trays or elements 7 and 8 are disposed within the housing 6. Water is supplied to the housing 6 and to the trays 7 therein through a conduit 9 under

2 the control of a solenoid valve 10. Water is discharged from the housing through a discharge conduit 11 which extends through a wall 12 of the cabinet 2. A spout 13 is provided at the outer end of the discharge conduit 11 for directing water into a suitable receptacle 14. The outer shell 15 of the cabinet may be recessed as indicated at 16, and the spout 13 located generally within this recess 16. A shelf 17, which is secured to the shell 15 within the area of the recess 16, is provided for supporting the receptacle 14. An air vent opening 6a is provided at the top of the housing 6 to facilitate discharge of water from the housing.

Referring now to the specific arrangement of the trays 7 and 8 within the housing as illustrated in Fig. 2, the trays 7 extend to and are secured to the forward wall 18 of the housing 6 but are spaced from the rear wall 19 of the housing, as indicated at 20. The trays 8, on the other hand, extend to and are secured to the rear wall 19 of the housing but are spaced from the forward wall 18, as indicated at 21. The sides 22 of all of the trays are secured to a wall 23 of the housing, which wall is secured in heat exchange relationship with the evaporator 5.

Water is supplied from the inlet conduit 9 against a deflector 24 which distributes the water into the uppermost tray within the housing. The zigzag arrangement of the trays within the housing provides a path for the water successively from each tray to the next tray below. The trays are shaped to provide upwardly extending sides 25 so that a predetermined amount of water is retained in each tray. By way of example the trays may be about two inches wide and one-half inch deep. Any water in excess of this amount overflows into the tray below. Thus, water is first supplied through the inlet conduit 9 into the uppermost tray within the housing. When this tray has been filled, any excess water overflows into the next tray below, filling that tray in turn. When the second tray is filled, the excess water overflows into the third tray, etc. When an amount of water sufficient to fill all of the trays has been supplied, any excess thereover overflows the lowest tray and passes into the discharge conduit 11. The solenoid of the valve 10 is energized to open the valve for supplying water to the cooler by an electric circuit 26 which may be closed by a push button 27 positioned adjacent the spout 13.

When the water cooler is first placed in operation, the valve 10 is opened to supply a sufficient amount of water to the cooler to fill all of the trays 7, 8 within the housing 6. The filling of the trays is easily determined by noticing the first trickle of water through the spout 13. The evaporator 5 is operated at a temperature below 32° F., that is, below the freezing point of water; for example, the evaporator may be operated in a temperature range in the neighborhood of 15° F. The housing 6 and the trays 7, 8 being in heat exchange relationship with the evaporator, the water within the trays, or at least a portion thereof depending on the lapse of time, is frozen into ice. When cooled water is thereafter desired, the circuit 26 of the solenoid valve 10 is closed by the push button 27 and water is supplied through the inlet conduit 9 to the trays 7, 8. These trays are substantially filled with ice as a result of the previous charge of water supplied thereto. Accordingly, the water now supplied flows successively over the bodies of ice contained in the trays and eventually overflows the lowest tray, passes into the discharge conduit 11 and is discharged through the spout 13 into the receptacle 14. Because of the contact with the relatively large surfaces of ice and because of the tortuous path through which the water must pass over a number of trays, the water discharged from the spout 13 has been cooled to a satisfactory temperature. The provision for causing the water to flow in contact with the ice provides for a very rapid cooling thereof so that cooled water is instantly available.

In order to minimize dripping from the spout after the solenoid valve 10 has been closed, a trap 28 is provided in the discharge conduit 11. When the solenoid valve is closed, water continues to flow from the spout 13 until air is drawn through the discharge conduit 11 and the trap 28 is partly emptied. Thereafter, any small amount of water overflowing from the trays 7 and 8 is substantially used up in filling the trap 28; accordingly any dripping from the spout 13 is minimized.

A modified form of my invention is shown in Fig. 3. The same numerals have been used to designate corresponding parts in Figs. 1 and 2 and in Fig. 3. Referring to Fig. 3, there is shown a housing 6 having a plurality of trays or elements 31 mounted therein. The wall 23 of the housing 6 is secured in heat exchange relationship with the evaporator 5 as in the form previously described. In the form shown in Fig. 3, however, the trays 31 are not only secured to the wall 23 of the housing, but all of these trays extend the full depth of the housing and are secured at their forward and rearward ends to the walls 18 and 19, respectively, of the housing. Water is supplied to the trays 31 through the inlet conduit 9 under the control of the solenoid valve 10. Cooled water is discharged from the housing 6 through the discharge conduit 11 including the trap 28.

In the form shown in Fig. 3, a vertical manifold is provided within the housing 32, this manifold extending substantially the full height of the housing adjacent the edges 33 of the trays. In order to supply water from the manifold 32 to the trays, a plurality of nozzles or orifices 34 are provided along the side of the manifold adjacent the trays 31.

As in the form previously described, the trays are shaped to provide upturned flanges 35 so that the trays will retain therein a predetermined amount of water or ice, these trays being substantially the same size as those shown in Figs. 1 and 2. When this cooler is placed in operation, water is supplied to the trays 31 by opening the valve 10. The supply of water is continued until all of the trays are substantially filled as indicated by a trickle of water through the spout 13 (not shown in Fig. 3). The orifices 34 are made of such size that an equal flow of water is secured through each orifice so that all of the trays will be substantially filled at about the same time. The evaporator 5 operates at a temperature below 32° F., for example, 15° F., so that the water initially supplied to fill the trays freezes into a body of ice within each tray.

When cooled water is subsequently desired, the valve is opened and water is supplied from the manifold 32 through the nozzles 34 to all of the trays 31. The water flows over the relatively large surface of ice provided by the total area of all of the trays 31 and it overflows along the edges 33 of the trays, passing downwardly into the discharge conduit 11. The water being in contact with this large total surface of ice is rapidly cooled, and cooled water is therefore instantly available through the discharge conduit 11.

Another modified form of my invention is shown in Figs. 4 and 5. The same numerals have been used to designate corresponding parts in Figs. 4 and 5 and in the preceding figures. The form shown in Figs. 4 and 5 includes a housing 6 having a wall 23 which is adapted to be secured in heat exchange relationship with the evaporator 5. Water is supplied through the inlet conduit 10 and is discharged from the housing through the discharge conduit 11. Within the housing 6 there are provided a plurality of vertical screens or elements 36. These screens 36 are spaced from each other horizontally from the front to the rear of the housing and are secured to the wall 23 so as to be in heat exchange relationship with this wall and through this wall with the evaporator 5. Water passes from the inlet conduit 10 into a manifold 37 extending horizontally from the front to the rear of the housing 6. A plurality of orifices or supply nozzles 38 are provided in the bottom of the manifold 37, one of the nozzles 38 being positioned adjacent the upper edge of each of the screens 36. Water is supplied in a fine spray from the nozzles 38 onto the screens 36, and because of the low temperature of these screens, the water initially supplied is rapidly frozen into a thin film or coating on the screens. Any excess of water is permitted to flow through the discharge conduit 11. When cooled water is thereafter desired, water is supplied through the inlet conduit 10 and the spray nozzles 38 onto the screens 36. This water, therefore, flows over the large area of ice frozen on the screens and is rapidly cooled thereby so that the water passing into the discharge conduit 11 is at a satisfactorily low temperature.

While I have shown and described specific embodiments of my invention, I do not desire my invention to be limited to the particular constructions shown and described, and I intend by the appended claims to cover all modifications within the spirit and scope of my invention.

What I claim as new and desire to secure by Letters Patent of the United States is:

1. In combination with a refrigerator including a cooling unit, a water-cooling arrangement comprising a housing secured in heat exchange relationship with the cooling unit, a plurality of water-receiving and retaining elements secured to said housing in spaced relationship to each other and in fixed direct heat conducting relationship with said cooling unit, said cooling unit operating at a temperature below the freezing point of water, and means for supplying water to said elements, each of said elements being formed to retain at least a portion of the water initially supplied thereto so that said portion is frozen on said elements to provide a body of ice on each of said elements whereby water subsequently supplied to said elements flows over said ice and is cooled rapidly by contact therewith.

2. In combination with a refrigerator including a cooling unit, a water-cooling arrangement comprising a housing secured in heat exchange relationship with the cooling unit, a plurality of water-receiving and retaining elements secured to said housing in spaced relationship to each other and in fixed direct heat conducting relationship with said cooling unit, said cooling unit operating at a temperature below the freezing point of water, means for supplying water to said elements, each of said elements being formed to retain at least a portion of the water initially supplied thereto so that said portion is frozen on said elements to provide a body of ice on each of said elements whereby water subsequently supplied to said elements flows over said ice and is cooled rapidly by contact therewith, and a discharge conduit for conducting cooled water from said housing, said discharge conduit extending through a wall of the refrigerator.

3. In combination with a refrigerator including a cooling unit, a water-cooling arrangement comprising a housing secured in fixed direct heat conducting relationship with the cooling unit, a plurality of vertically spaced trays secured to said housing in fixed direct heat conducting relationship with said cooling unit, said cooling unit operating at a temperature below the freezing point of water, and means for supplying water to said trays, each of said trays being formed to retain at least a portion of the water initially supplied thereto so that said portion is frozen on said trays to provide a body of ice on each of said trays whereby water subsequently supplied to said trays flows over said ice and is cooled rapidly by contact therewith.

4. In combination with a refrigerator including a cooling unit, a water-cooling arrangement comprising a housing secured in heat exchange relationship with the cooling unit, a plurality of vertically-spaced trays within said housing, said trays being secured to said housing in heat exchange relationship with said cooling unit, said cooling unit operating at a temperature below the freezing point of water, means for supplying water to the uppermost of said trays, said trays being arranged in said housing so that each tray extends beyond a portion of the tray immediately thereabove whereby water flows successively over said trays, said trays being shaped to retain water therein, and a discharge conduit for receiving water from the lowest of said trays, at least a portion of the water initially supplied to said trays being frozen in said trays to provide a body of ice on said trays whereby water subsequently supplied to said trays flows over said ice and is cooled rapidly by contact therewith.

5. In combination with a refrigerator including a cooling unit, a water-cooling arrangement comprising a housing secured in heat exchange relationship with the cooling unit, a plurality of vertically-spaced trays within said housing, said trays being secured to said housing in heat exchange relationship with said cooling unit, said cooling unit operating at a temperature below the freezing point of water, alternate trays being secured to one wall of said housing and being spaced from the opposite wall of said housing, the remainder of said trays being secured to said opposite wall and being spaced from said one wall whereby water overflowing from one tray falls into the tray immediately therebelow and a zigzag path for the flow of water is provided, said trays being shaped to retain water therein, and means for supplying water to the uppermost of said trays, at least a portion of the water initially supplied to said trays being frozen in said trays to provide a body of ice in said trays whereby water subsequently supplied to said trays flows over said ice and is cooled rapidly by contact therewith.

6. In combination with a refrigerator including a cooling unit, a water-cooling arrangement comprising a housing secured in heat exchange relationship with the cooling unit, a plurality of vertically-spaced trays within said housing, said trays being secured to said housing in heat exchange relationship with said cooling unit, said cooling unit operating at a temperature below the freezing point of water, an inlet conduit for supplying water to said housing, a deflector within said housing for directing water from said inlet conduit into the uppermost of said trays, said trays being arranged in said housing so that each tray extends beyond a portion of the tray immediately thereabove whereby water flows successively over said trays, and a discharge conduit for receiving water from the lowest of said trays, at least a portion of the water initially supplied to said trays being frozen in said trays to provide a body of ice on said trays whereby water subsequently supplied to said trays flows over said ice and is cooled rapidly by contact therewith.

7. In combination with a refrigerator including a cooling unit, a water-cooling arrangement comprising a housing secured in fixed direct heat conducting relationship with the cooling unit, a plurality of water-receiving and retaining elements secured to said housing in spaced relationship to each other and in fixed direct heat conducting relationship with said cooling unit, said cooling unit operating at a temperature below the freezing point of water, an inlet conduit for supplying water to said water-receiving elements, a solenoid valve for controlling flow of water through said inlet conduit, a discharge conduit extending from said housing through a wall of the refrigerator for supplying water from said housing to the exterior of said refrigerator, and means positioned on the exterior of said refrigerator adjacent said discharge conduit for energizing said solenoid valve to supply water to said water-receiving elements, each of said elements being formed to retain at least a portion of the water initially supplied thereto so that said portion is frozen on said elements to provide a body of ice on said elements whereby water subsequently supplied to said elements flows over said ice and is cooled rapidly by contact therewith.

8. In combination with a refrigerator including a cooling unit, a water-cooling arrangement comprising a housing secured in fixed direct heat conducting relationship with the cooling unit, a plurality of water-receiving and retaining elements secured to said housing in spaced relationship to each other and in fixed direct heat conducting relationship with said cooling unit, said cooling unit operating at a temperature below the freezing point of water, means for supplying water to said elements, each of said elements being formed to retain at least a portion of the water initially supplied thereto so that said portion is frozen on said elements to provide a body of ice on said elements whereby water subsequently supplied to said elements flows over said ice and is cooled rapidly by contact therewith, and a discharge conduit for receiving water from said housing, said discharge conduit extending from said housing through a wall of the refrigerator, said discharge conduit including a trap therein for minimizing drip from the end of said discharge conduit.

9. In combination with a refrigerator including a cooling unit, a water-cooling arrangement comprising a housing secured in heat exchange relationship with the cooling unit, a plurality of vertically-spaced trays within said housing, said trays being secured to said housing in heat exchange relationship with said cooling unit, said cooling unit operating at a temperature below the freezing point of water, a manifold within said housing extending adjacent said trays, and an inlet conduit for supplying water to said manifold, said manifold including a plurality of orifices for supplying water to said trays, one of said orifices being disposed adjacent each of said trays, said trays being shaped to retain a predetermined maximum amount of water therein, at least a portion of the water initially supplied to said trays being frozen on said trays to provide a body of ice on said trays whereby water subsequently supplied to said trays flows over said ice and is cooled rapidly by contact therewith.

10. In combination with a refrigerator including a cooling unit, a water-cooling arrangement comprising a housing secured in heat exchange relationship with the cooling unit, a plurality of screens positioned vertically within said housing, said screens being horizontally spaced from each other, said screens being secured to said housing in heat exchange relationship with said cooling unit, said cooling unit operating at a temperature below the freezing point of water, an inlet conduit for supplying water to said housing, and a manifold connected to said inlet conduit and extending horizontally within said housing adjacent the tops of said screens, said manifold including a plurality of orifices for directing water onto said screens, each of said orifices being arranged adjacent one of said screens, at least a portion of the water initially supplied to said screens being frozen on said screens to provide a body of ice on said screens whereby water subsequently supplied to said screens flows over said ice and is cooled rapidly by contact therewith.

CARL R. SEBENS.

References Cited in the file of this patent

UNITED STATES PATENTS

| Number | Name | Date |
|---|---|---|
| 1,633,372 | Copeman | June 21, 1927 |
| 1,692,223 | Pinkerton | Nov. 20, 1928 |
| 1,738,126 | Stout | Dec. 3, 1929 |
| 1,840,375 | White | Jan. 12, 1932 |
| 1,856,982 | West | May 3, 1932 |
| 1,974,736 | Candor | Sept. 25, 1934 |
| 2,003,532 | Gloor | June 4, 1935 |
| 2,022,164 | Sweetland | Nov. 26, 1935 |